(12) United States Patent
Mattsson et al.

(10) Patent No.: US 7,053,527 B2
(45) Date of Patent: May 30, 2006

(54) ELECTROMECHANICAL MOTOR AND ASSEMBLING METHOD THEREFORE

(75) Inventors: Christer Mattsson, Norrtälje (SE); Mats Bexell, Uppsala (SE); Stefan Johansson, Uppsala (SE); Olov Johansson, Uppsala (SE); Jonas Eriksson, Uppsala (SE); Sölve Lindmark, Uppsala (SE)

(73) Assignee: Piezomotor Uppsala AB, Uppsala (SE)

( * ) Notice: Subject to any disclaimer, the term of this patent is extended or adjusted under 35 U.S.C. 154(b) by 206 days.

(21) Appl. No.: 10/737,791

(22) Filed: Dec. 18, 2003

(65) Prior Publication Data

US 2005/0134146 A1  Jun. 23, 2005

(51) Int. Cl.
*H01L 41/08* (2006.01)

(52) U.S. Cl. .................. 310/328; 310/331; 310/332; 310/348

(58) Field of Classification Search ............... 310/324, 310/328, 330, 331, 348
See application file for complete search history.

(56) References Cited

U.S. PATENT DOCUMENTS

| | | | | |
|---|---|---|---|---|
| 4,195,243 A | * | 3/1980 | Thaxter | 310/317 |
| 5,203,537 A | * | 4/1993 | Jacobs et al. | 251/129.06 |
| 6,242,846 B1 | | 6/2001 | Ashizawa et al. | 310/323.02 |
| 6,437,485 B1 | | 8/2002 | Johansson | 310/332 |
| 6,617,762 B1 | * | 9/2003 | Kurano et al. | 310/328 |
| 6,703,761 B1 | * | 3/2004 | Gallmeyer et al. | 310/316.01 |
| 6,940,211 B1 | * | 9/2005 | Pelrine et al. | 310/330 |
| 6,967,430 B1 | * | 11/2005 | Johansson | 310/328 |
| 2005/0046309 A1 | * | 3/2005 | Kim et al. | 310/328 |

FOREIGN PATENT DOCUMENTS

| | | | | |
|---|---|---|---|---|
| JP | 1-234064 | * | 9/1989 | 310/330 |
| WO | WO 00/44208 | | 7/2000 | |

* cited by examiner

*Primary Examiner*—Thomas M. Dougherty
(74) *Attorney, Agent, or Firm*—Young & Thompson (57) ABSTRACT

In an electromechanical motor, elongated electromechanical drive elements are mechanically and preferably also electrically attached to a carrier. A spring is arranged to apply a force on the electromechanical drive element by pressing the backside of the carrier at a pivot point. The carrier is allowed to pivot around the pivot point around an axis parallel to a the element elongation. The electromechanical drive element is thereby suspended in a floating manner. The electromechanical drive elements are arranged to present a bending motion having strokes perpendicular to the elongation. The pivot point, the mechanical joint between the carrier and the electromechanical drive element, and preferably also a nodal point of bending motions of the electromechanical element are situated at a common plane perpendicular to the element elongation. In one embodiment, the electromechanical drive element is provided with metallizations to which the carrier is soldered.

23 Claims, 6 Drawing Sheets

ELECTROMECHANICAL MOTOR AND ASSEMBLING METHOD THEREFORE

TECHNICAL FIELD

The present invention relates generally to miniature motors and assembling methods therefore and in particular electromechanical motors.

BACKGROUND

There are numerous applications with the need for extremely miniaturized motors that are able to make controlled fine positioning. For example, in consumer products extremely small, low weight, low power consumption and inexpensive motors are typically requested. The motion range is often in the order of millimeters and with an accuracy of micrometers.

In the published international patent application U.S. Pat. No. 6,437,485 B1 an electromechanical actuator based on a double electromechanical element is disclosed. The electromechanical elements have electrical connections at the outer end faces and mechanical supports against a stator at respective outer ends and are interconnected by an electromechanically inactive portion, to which a driving portion is attached. By supplying well-defined voltage signals to multimorphs, bimorphs or monomorphs of each electromechanical element, the driving portion is moved in two dimensions for transferring a motion to a body. The basic concept proved to be very useful. However, in order to optimize the dynamic behavior of the electromechanical elements for different applications, very high assembling precision, time-consuming empirical tests, high sensitivity to external conditions and/or precautions to prevent fatigue may be necessary. In particular, the electrical and mechanical connects were difficult to accomplish in a controlled manner. During the soldering process, there are for instance several geometrical parameters that have to be well controlled which is difficult to obtain in an automated process. Since the vibrating drive element will have substantial vibration amplitude at the end face, the electrical and mechanical connects will also be exposed to large mechanical stresses, which is highly undesirable. With the flexible printed circuit board attached to the end faces, the damping of the vibrations will also increase and the efficiency will therefore be reduced. In a general case, the relations between more or less controllable parameters are very complicated.

Many of the products envisioned for this type of electromechanical motor are extremely price sensitive, and if the tolerances in manufacturing are too narrow, there will be a reduction in yield and hence a higher cost. Prior-art electromechanical motors are generally not particularly well suited for cost-efficient mass production.

SUMMARY

A general problem with small-volume, high-precision prior art electromechanical motors is that the dynamical behavior is difficult to predict and control. Another problem with prior art electromechanical motors is that the design is not optimized for efficient high-precision assembling. Yet another problem with prior art electromechanical motors is that fatigue fractures in mechanical and electrical connects are relatively frequent and difficult to control.

An object of the present invention is to provide electromechanical motors having increased predictability of dynamical behavior. Another object of the present invention is to provide electromechanical motors presenting a reduced risk for fractures. Yet another object of the present invention is to provide electromechanical motors having a design which enables easy and accurate assembling, as well as assembling methods therefore.

The above objects are achieved by devices and methods according to the enclosed patent claims. In general words, elongated electromechanical drive elements are mechanically and preferably also electrically attached to a carrier. A spring is arranged to apply a force on the electromechanical drive element by pressing the backside of the carrier at a pivot point. The carrier is allowed to pivot around the pivot point around an axis parallel to the element elongation. The electromechanical drive element is thereby suspended in a floating manner. The electromechanical drive elements are arranged to present a bending motion having strokes perpendicular to the elongation. The pivot point and the mechanical joint between the carrier and the electromechanical drive element situated at a common plane perpendicular to the element elongation. Preferably, a nodal point of bending motions of the electromechanical element is also situated substantially at this common plane. In one embodiment, the electromechanical drive element is provided with metallizations to which the carrier is soldered. These metallizations are provided at the longitudinal sides of the electromechanical drive element. The metallized areas are soldered or fastened by other means, e.g. by gluing, to attachment pads of a flexible printed circuit board, preferably by using surface mounting techniques.

In preferred embodiments, a motor comprises two electromechanical drive elements arranged on opposite sides of a body to be moved. Each drive element comprises two interconnected electromechanically active volumes and a drive pad attached substantially between the active volumes. The drive elements are attached to a flexible printed circuit board by the two pairs of metallized areas provided a small distance from each end of the electromechanical drive elements. A spring presses the two electromechanical drive elements towards each other, clamping the body there between. The spring applies preferably its force at the symmetry line of the electromechanical drive elements in the vicinity of the metallized areas.

Further preferred embodiments are described further below.

The placement of the mechanical and preferably also the electrical connect at a position where the vibration amplitude is low, makes the connects less sensitive to stresses due to vibrations. The electromechanical devices according to the present invention achieve simpler vibration characteristics compared to most prior art solutions since the electromechanical drive element pivot around a point provided close to the positions exhibiting small strokes. Furthermore, the design allows for easy assembling, while still obtaining reasonable mounting accuracy, since the relative position of the circuit board and the electromechanical drive element preferably is aligned by the metallized areas and the attachment pads. Furthermore, the devices according to the present invention are more robust to fracture.

BRIEF DESCRIPTION OF THE DRAWINGS

The invention, together with further objects and advantages thereof, may best be understood by making reference to the following description taken together with the accompanying drawings, in which:

FIG. 5b is a cross-sectional view of FIG. 5a;

DETAILED DESCRIPTION

The exemplifying embodiments of the present invention, described below are connected to the general element design presented in U.S. Pat. No. 6,437,485 B1. However, the inventive ideas can be applied also on other types of electromechanical actuators and motors, and the scope of the patent protection should not be limited only to the embodiments presented here below, but instead be defined solely by the specifications of the patent claims.

Figure 1:
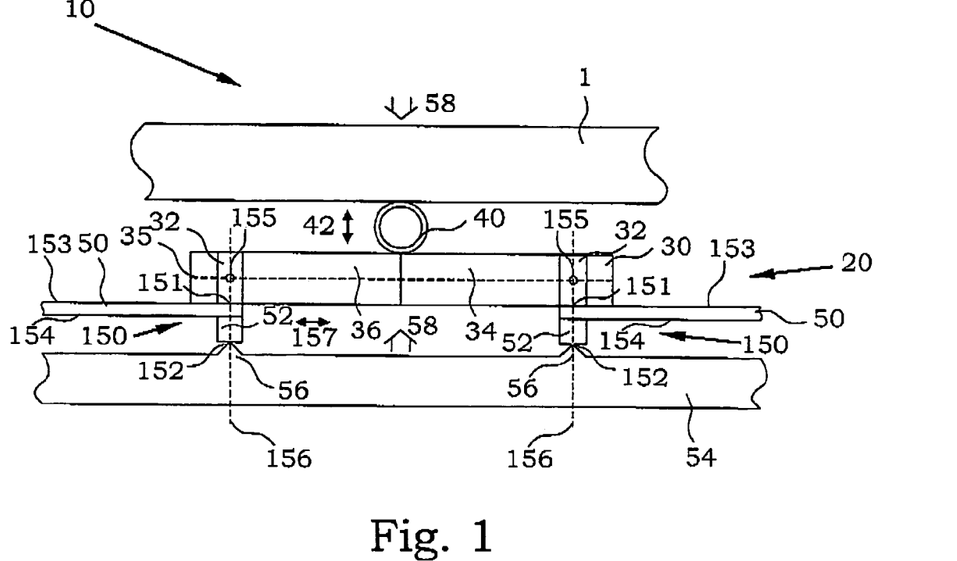
FIG. 1 is a schematic drawing of an embodiment of an electromechanical motor according to the present invention.

In FIG. 1, a simplified illustration of an embodiment of a double multimorph bending vibration actuator arrangement 10, in this case a motor. An electromechanical motor can be considered as an electromechanical actuator driving a body to be moved. A stator 20 comprises an electromechanical drive element 30, actuating against a body 1 to be moved by a drive pad 40. The electromechanical drive element 30 is attached to and supported by a first (upper) side 153 of a flexible printed circuit board 50. Pivot supports 52 are attached on the opposite side 154 of the flexible printed circuit board 50. The pivot supports 52 can be designed as thickened portions integrated in the flexible printed circuit board 50 or separate volumes attached by e.g. gluing. The pivot supports 52 and the flexible printed circuit board together constitute a carrier 150 of the electromechanical drive element 30. A spring 54 presses the electromechanical drive element 30 against the body 1 by a normal force, illustrated by the arrows 58. The spring 54 transfers the force by tips 56 to the pivot supports 52 at a pivot point 152. The electromechanical drive element 30 comprises two active sections 34 and 36, respectively, which are independently drivable in bending motions with strokes up and down in the figure, as illustrated by the double arrow 42. The bending actions of the active sections 34 and 36 creates a motion of the drive pad 40 in the direction 42 as well as in directions transversal to the direction 42. The body 1 is finally moved by the interaction with the drive pad 40.

The contacting between the spring 54 tips 56 and the pivot support 52 suspends the electromechanical drive element 30 in a floating manner. In other words, the carrier 150 is able to pivot relative to the spring 54 around the pivot point 152 around an axis parallel to the electromechanical drive element 30, i.e. parallel to arrow 157.

The actual motion of the body 1 depends in general on the vibration motions of the electromechanical drive element 30. This vibration depends on one hand on the structure of the electromechanical material and electrodes and the voltage signals exciting the material and on the other hand on interaction with surrounding parts, such as the flexible printed circuit board 50, the drive pad 40, the body 1 itself, the pivot supports 52 and the spring 54. Parameters involving friction, elasticity characteristics, masses etc. are important for determining the actual vibration conditions for the electromechanical drive element 30. It is therefore in a general case very difficult indeed to control all such parameters with an accuracy that provides a good predictability and reproducibility. In many practical cases, the design has to be tested empirically and adjusted in order to achieve a good operation. Such a situation is generally not very satisfactory, and a wish is to have a better overall control of the operation.

Figure 2A:
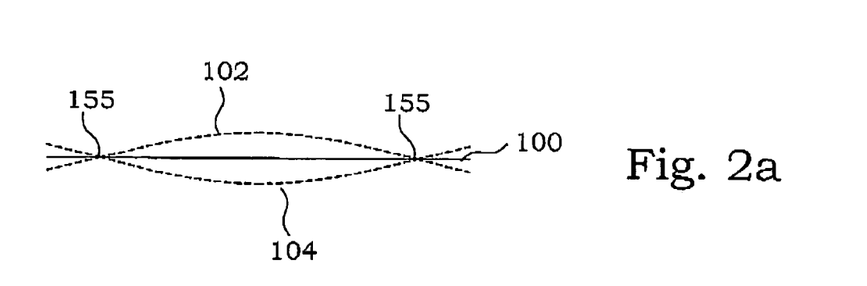
FIGS. 2a and 2b are diagrams illustrating bending modes of a free vibration beam.
Figure 2B:
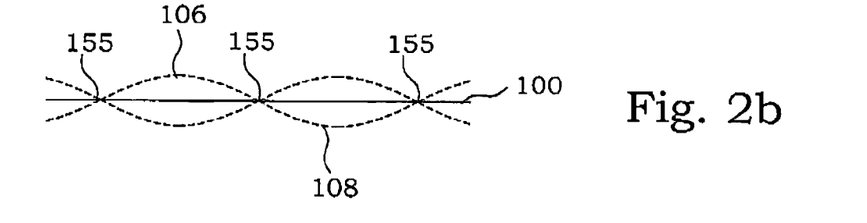
Figure 2C:
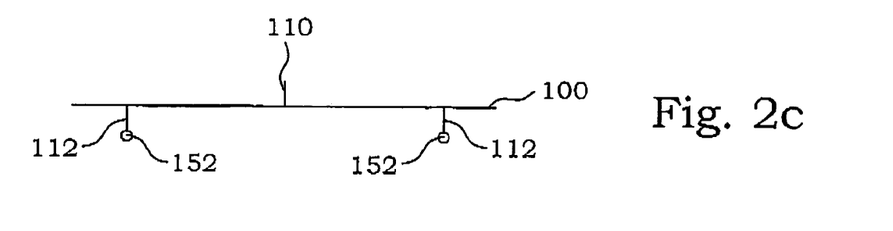
FIG. 2c is a schematic representation of a vibrating beam utilized in an electromechanical motor.

In mechanical science, the conditions of a free vibrating beam are fairly well understood. FIG. 2a illustrates schematically such a beam 100. Broken curves 102 and 104 illustrate different strokes of the beam during a certain vibration mode. A nodal point is denoted by 155. FIG. 2b illustrates the beam 100 at another vibration mode, indicated by the broken curves 106 and 108. Frequencies, stroke amplitudes, energy content etc. are relatively easy to determine. However, when such a beam 100, as illustrated in FIG. 2c is connected to a drive pad 110 and pivot points 152, e.g. via a support lever 112, the situation rapidly becomes more intricate. In FIG. 2c, the drive pad 110 will influence the vibrations depending on its mass, spring constant, length, friction coefficient, damping characteristics etc. The translational and rotational spring and damping characteristics of the pivot points 152 and the height, spring and damping characteristics of the support levers 112 will also be of importance. From the above reasoning, anyone skilled in the art realizes that a situation where as few parameters as possible are of importance is to prefer.

According to the present invention the electromechanical drive element is suspended in a floating manner by attaching it to the flexible printed circuit board, which in turn is pivotable at the pivot points 152. The flexible printed circuit board or the spring restricts the translational movability of the electromechanical drive element, while the vibrational behavior of the electromechanical drive element is influenced by a minimum. The most important detail is the attachment of the electromechanical drive element to the flexible printed circuit board. The flexible printed circuit board gives a certain flexibility, mainly for bending motions, but restricts longer translational motions. At the same time, the elastic properties differ significantly from the elastic properties of the electromechanical drive element, which means that any motion or shape changes will introduce strain in the mechanical connection between the electromechanical drive element and the carrier.

In prior art devices using flexible printed circuit boards for suspending drive elements, the mechanical connection or attachment has been provided at the end or at the opposite side, with respect of the drive pad, of the drive element, i.e. at the bottom side in FIG. 1. The joints to the flexible printed circuit board will experience bending stresses, which at high operation voltages and close to resonance may be quite high. The corresponding stresses in the interface between the metallization and drive element or the soldering material constituting a typical joint might eventually cause fracture. Furthermore, such bending forces become particularly cumbersome if the short end of the electromechanical drive element is utilized for enforcing the joint.

According to the present invention, the attachment of the electromechanical drive element to the flexible printed circuit board should be performed at a point or plane, where the mean stresses are small. Preferably, at least a part of the joint is substantially parallel to the strokes of the bending motion of the electromechanical drive element. Returning to FIG. 1, assuming that the electromechanical drive element 30 is essentially symmetric around an axis illustrated as a dotted line 35, points 155 are approximate nodal points at which the shape changes are very small. According to the present invention, areas 32 at the electromechanical drive element 30 are metallized, preferably by silver, in order to constitute a firm base for a joint 151 with the flexible printed circuit board 50. This metallization 32 can at the same time be used as an electrical connection of electrodes in the electromechanical drive element 30. The areas 32 have surfaces being substantially parallel to the strokes 42 of the bending motion of the electromechanical drive element and substantially parallel to the main extension of the electromechanical drive element 30. In other words, if the electromechanical drive element 30 is an elongated rectangular parallelepiped, the areas 32 are in this embodiment situated at the longitudinal sides of the elongated rectangular parallelepiped. A joint 151, typically a soldering material connects the areas 32 with the flexible printed circuit board 50. Such a joint 151 has been proven to be more robust, despite the fact that the two connected surfaces, the flexible printed circuit board 50 and the areas 32 are substantially perpendicular to each other.

Empirical tests show that the stresses on a joint 151 vary with the distance from the end of the drive element at which the electromechanical element is attached. According to the present invention, the joint 151 is provided close to the nodal point 155. Ideally, a plane 156 perpendicular to the element extension 157 connects the nodal point and the joint 151. In other words, the nodal point 155 and the joint 151 are situated at the same non-negligible distance from the end of the electromechanical drive element 30. The exact position varies with the detailed design of the device.

Also the position of the pivot points 152 are important. According to the invention, the pivot points 152 are also positioned substantially in the place 156. This supporting of the carrier 150 gives the electromechanical drive element 30 a vibration behavior that is almost independent of many critical parameters, which leads to vibration modes that are easier to control and predict.

Figure 3:
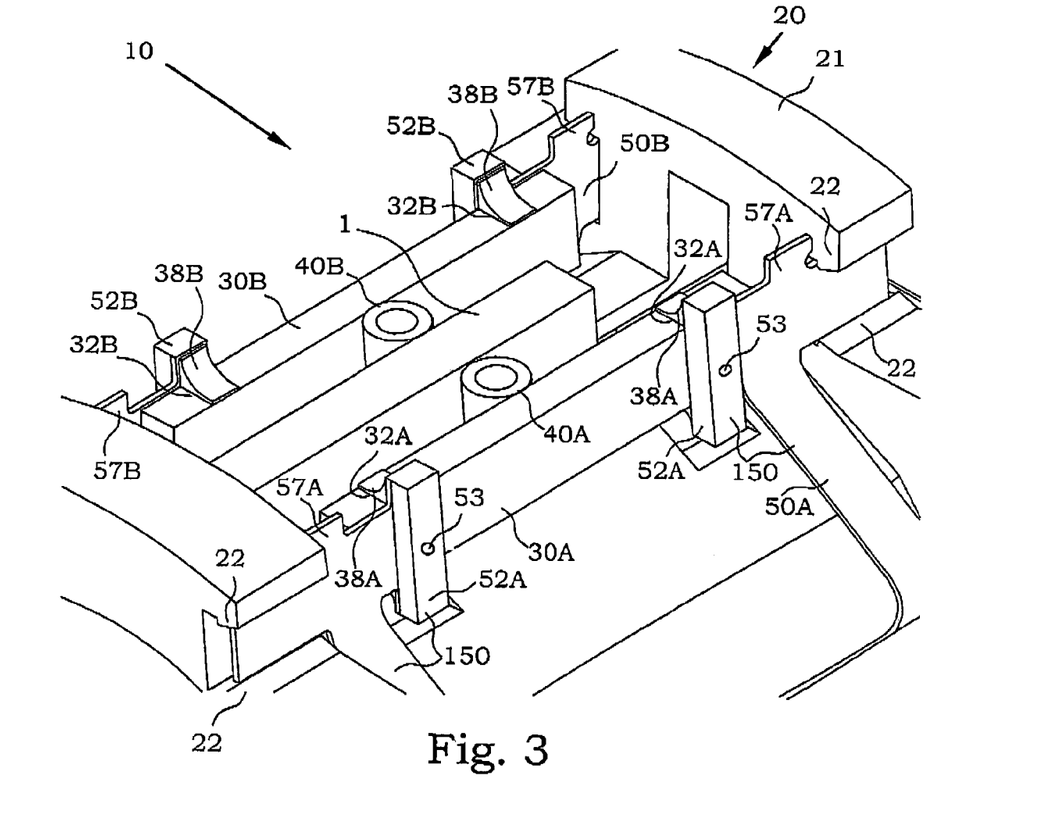
FIG. 3 is a perspective view of a part of an embodiment of an electromechanical motor according to the present invention.

FIG. 3 illustrates a somewhat more realistic drawing of a part of an embodiment of a device according to the present invention. The spring has been removed in order to reveal the details in the center of the electromechanical motor 10. In this embodiment, the electromechanical motor 10 comprises two driving sets, each one having an electromechanical driving element 30A, 30B. The two electromechanical driving elements 30A, 30B are positioned on opposite sides of the body 1 to be moved. Parts that are similar to the ones in FIG. 1 are denoted by the same reference numbers extended by an "A" or "B" to distinguish between the two sides.

The flexible printed circuit boards 50A and 50B are cut into a suitable shape. It can be seen that the flexible printed circuit boards 50A and 50B are provided with tabs extending outside the width of the electromechanical drive elements 30A, 30B in order to support a side joint 38A, 38B with the electromechanical drive elements 30A, 30B. Also the pivot supports 52A, 52B are extended to give a desired mechanical behavior. The pivot supports 52A, 52B present holes 53 at their backs situated in the vertical symmetry line of the electromechanical drive elements, which holes 53 are used for positioning of the spring, as described in further detail further below. The holes 53 define the positions of the pivot points.

The stator 20 comprises a backbone part 21, giving the overall structural support for the motor. The flexible printed circuit boards 50A, 50B are kept in place by barbs 22 provided at the backbone part 21. The position accuracy in direction is in this particular embodiment secured by lugs 57A, 57B, supporting on inside surfaces of the backbone part 21.

The motor in FIG. 3 is designed to be insensitive to sudden external chocks, e.g. if the device is dropped in the floor. The electromechanical drive elements 30A, 30B are, as discussed further below, pressed against the body 1, but there are no essentially rigid mechanical connections with the backbone 21. The position is determined by the mechanical end stops such as the lugs 57A, 57B. The forces on the sensitive parts in the motor, i.e. the electromechanical drive elements 30A, 30B, will essentially be determined by the inertial forces in the stator itself. Due to the small size of the stator, these forces will be very small and therefore extremely high retardations can be accepted without risk for failure.

Figure 4A:
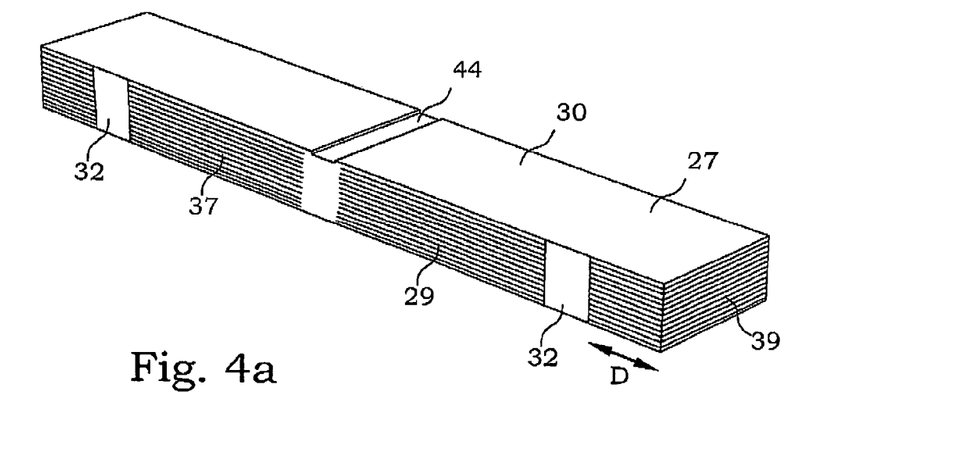
FIGS. 4a–e are perspective views of embodiments of electromechanical drive elements according to the present invention.

FIG. 4a is a perspective view of a separate electromechanical drive element 30 that can be used in the device of FIG. 3. The long sides 37 of the electromechanical drive element 30 are according to the present invention provided with metallized areas 32 to which the connection with the flexible printed circuit board is to be established. The metallized areas 32 are also used for connecting electrodes 29 within the electromechanical drive element. The metallized areas 32 are preferably provided by any conventional printing techniques, but may also be provided by other methods, such as evaporation or other thin film deposition techniques. It is here very clearly seen that the metallized areas 32 are situated at a distance D from the short sides 39 of the electromechanical drive element 30, corresponding to the pivot point position. The electromechanical drive element 30 is also provided with a recess 44 in its upper surface 27. This recess 44 will serve as an assembling aid for the drive pad, described more in detail below. In order to achieve a high precision, the cutting of the main dimensions of electromechanical drive element 30, the provision of the recess 44 and the provision of the metallized areas 32 are provided in the same manufacturing phase. The same machining fastening can thus be used, which ensures that the relative geometrical accuracy between the metallized areas 32, the recess 44 and the outer measures of the electromechanical drive element 30 becomes high. The electromechanical drive element 30 has corresponding symmetrical metallized areas also on the not shown backside.

Figure 4B:
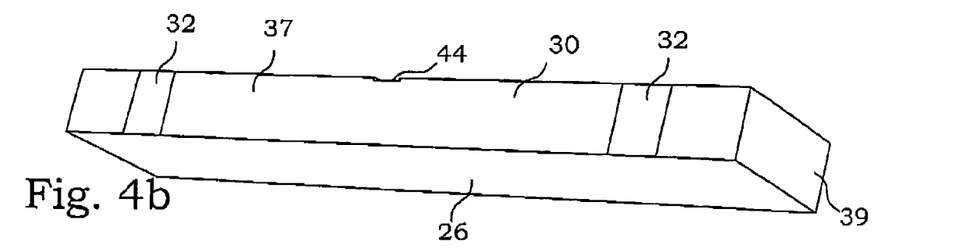

FIG. 4b is a perspective view of the electromechanical drive element 30 of FIG. 4a seen from below. In this embodiment the metallized areas 32 are solely provided at the sides of the electromechanical drive element 30. The bottom side 26 of the electromechanical drive element 30 is essentially free from metallization.

Figure 4C:
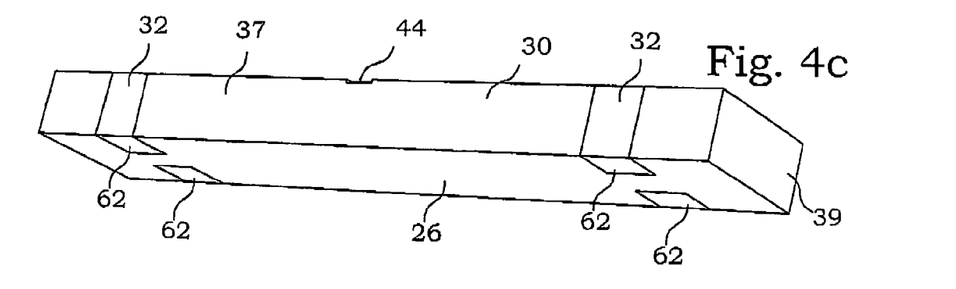

FIG. 4c is a perspective view of another embodiment of an electromechanical drive element 30 that can be used in the device of FIG. 3. Here the metallization continues around to the bottom side 26, giving rise to bottom metallized areas 62 in electrical connection with the side areas 32. Such bottom metallized areas 62 may in certain applications facilitate automatic assembling, as described further below.

Figure 4D:
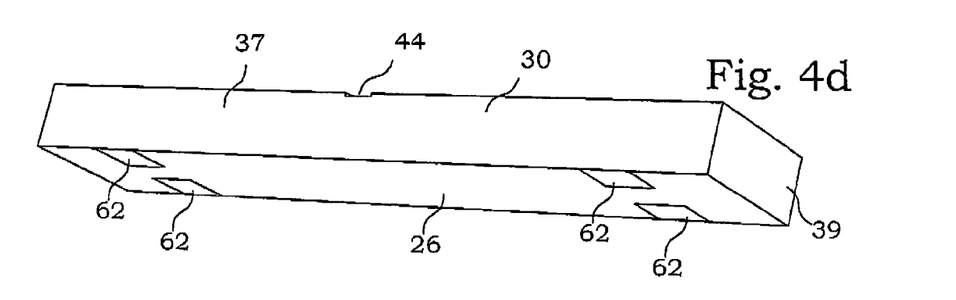

FIG. 4d is a perspective view of yet another embodiment of an electromechanical drive element 30 that can be used in the device of FIG. 3. Here the metallization is only provided at bottom areas 62. As above, such bottom metallized areas 62 may in certain applications facilitate automatic assembling, as described further below. The metallized areas 62 may still be used for contacting the different electrodes in the electromechanical drive element 30, for instance by providing a via hole through the stack of electromechanical layers, which then is filled with conducting material. The internal contacting of the electrodes also has the advantage that the binding strength between the solder pad and drive element typically is increased.

Figure 4E:
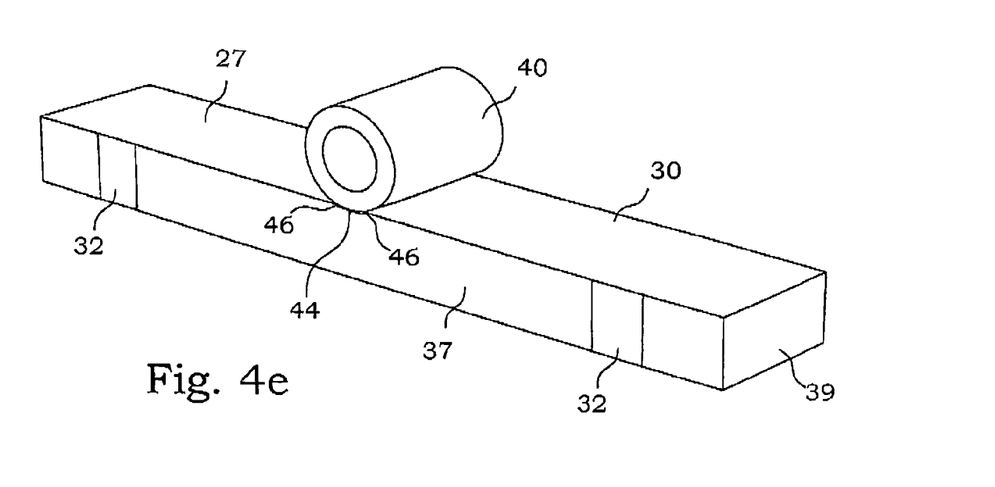

In FIG. 4e, the drive pad 40, in this embodiment in the shape of a cylinder, is mounted on the electromechanical drive element 30. The recess 44 in the electromechanical drive element 30 is deep enough, so that the drive pad 40 only supports on the edges 46 of the recess. In such a way, the drive pad 40 is accurately self-centering when it is glued to the electromechanical drive element 30.

Figure 5A:
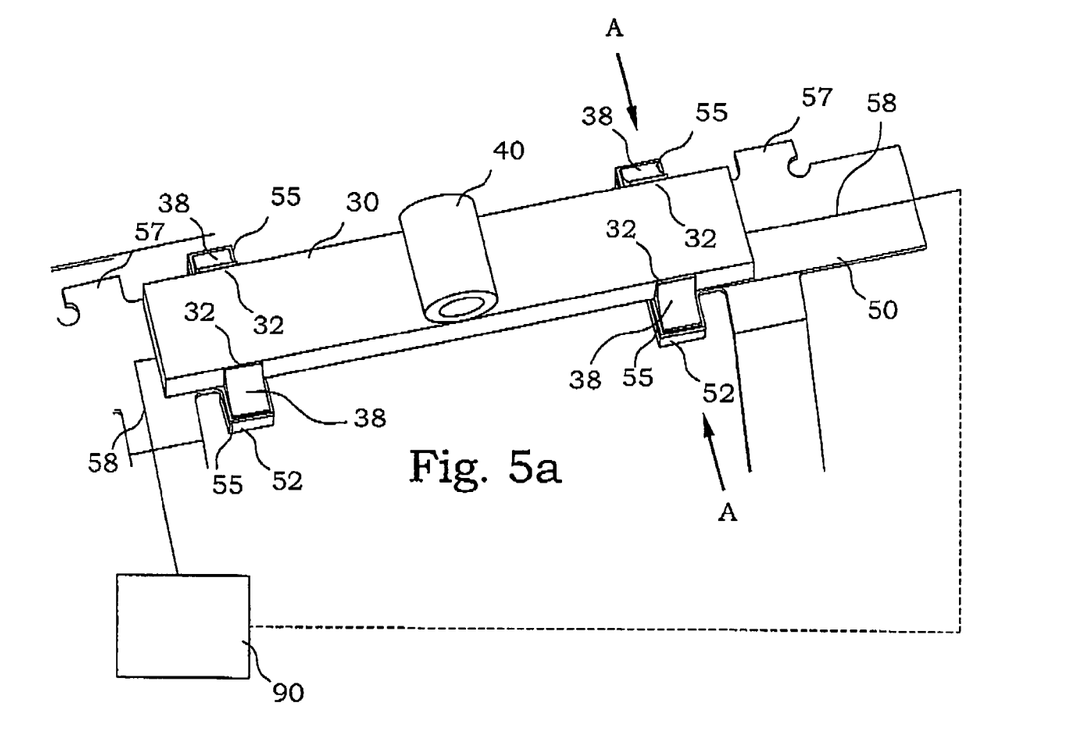
FIG. 5a is a perspective view of an embodiment of an electromechanical drive element mounted at a flexible printed circuit board according to the present invention.

FIG. 5a is a perspective view of the electromechanical drive element 30, when attached to the flexible printed circuit board 50. The tabs 55 of the flexible printed circuit board 50 and the pivot support 52 are here easily seen. The side joints 38 is seen to mechanically and electrically connect the tab 55 of the flexible printed circuit board 50 and the metallized area 32 of the electromechanical drive element 30. The supporting lugs 57 are also easily seen.

Since the joints 38 preferably also are electrical connections between the flexible printed circuit board 50 and the electromechanical drive element 30, voltage signals for activating the electromechanical drive element 30 can be supplied via the flexible printed circuit board 50. At the right side a voltage connection 58 is provided from the side, i.e. parallel to the main motion direction. At the left side, a voltage connection 58 is instead provided in a tangential direction. Anyone skilled in the art realizes that voltage from a voltage supply 90 can be supplied to the electromechanical drive element 30 from any direction depending on the actual design.

In FIG. 3 and FIG. 5a, the flexible printed circuit board 50 is cut in such a way that there is no material between the positions of the tabs 55, below the main part of the electromechanical drive element 30. In other embodiments, however, the flexible printed circuit board could be a continuous board covering the entire bottom of the electromechanical drive element 30, or parts thereof.

Figure 5B:
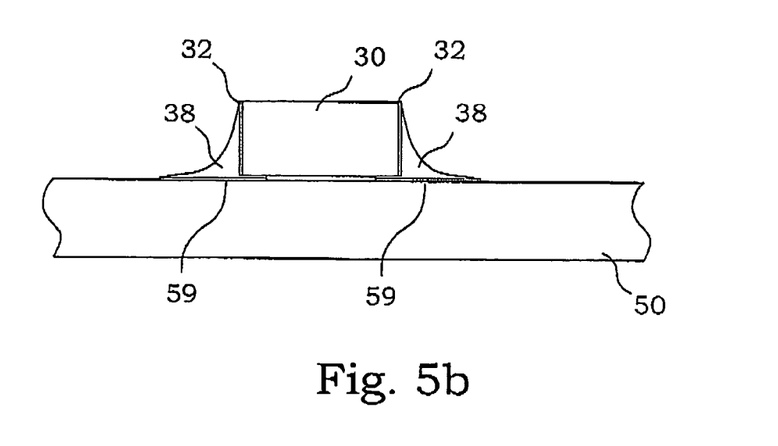

FIG. 5b is a cross-sectional view along the line A—A in FIG. 5a, which illustrates the attachment of the electromechanical drive element 30 to the flexible printed circuit board more in detail. In this embodiment, the flexible printed circuit board 50 is provided with printed conductor pads 59 separated by a distance, which is slightly smaller than the width of the electromechanical drive element 30. By providing liquid soldering material on these pads 59 and then positioning the electromechanical drive element 30 approximately at the right place, surface tension of the soldering material will automatically wet the metallized areas 32 on the electromechanical drive element 30 and will also automatically center the electromechanical drive element 30 with respect to the pads 59. In such a way a very high assembling accuracy can be achieved. As can be seen in FIG. 5b, this embodiment gives a joint 38 than contacts the entire side area 32 and the pad 59, and that also exists a short distance under the electromechanical drive element 30. Most of the bottom side of the electromechanical drive element 30 will, however, be assembled a very short distance above the surface of the flexible printed surface board 50, which means that the joints 38 will carry the applied force from the spring 54.

When the forces applied with the spring 54 (described below) are high, it will, however, be advantageous to have the carrier, i.e. the flexible printed circuit board 50 and the pivot supports 52, in direct mechanical contact with the electromechanical drive element 30. The stresses in the connects 38 will then be substantially reduced and the risk for fatigue or fracture minimized. There are several ways to get a direct contact between the pivot supports 52 and the electromechanical drive element 30. If we consider a pivot support 52 either attached to or integrated in the flexible printed circuit board 50, it is desired to have a contact between the flexible printed circuit board 50 and the electromechanical drive element 30. One technique is to have a mesa structure on the flexible printed circuit board 50 in between the flexible printed circuit board 50 and electromechanical drive element 30. The surface tension of the solder then pulls the electromechanical drive element 30 against this mesa.

Another technique to accomplish this is to have the solder pads on the flexible printed circuit board 50 with a larger separation than the width of the electromechanical drive element 30. When placing the electromechanical drive element 30 on the flexible printed circuit board 50, the surface tension of the solder to will pull the electromechanical drive element 30 against the flat flexible printed circuit board 50.

A third technique is to press the drive element against the flexible printed circuit board 50 during a soldering or conducting gluing process. Yet another technique is to apply glue after the soldering to fill the spacing between the electromechanical drive element 30 and the flexible printed circuit board 50.

The assembling principles presented above are well suited for surface mounting techniques used in conventional electronics manufacturing. This means that the assembling of the electromechanical parts of the electromechanical motor can be performed in a highly automated and inexpensive manner. Surface mounting of electromechanical components as such is not novel, and e.g. disclosed in the published international patent application WO 00/44208.

Figure 6:
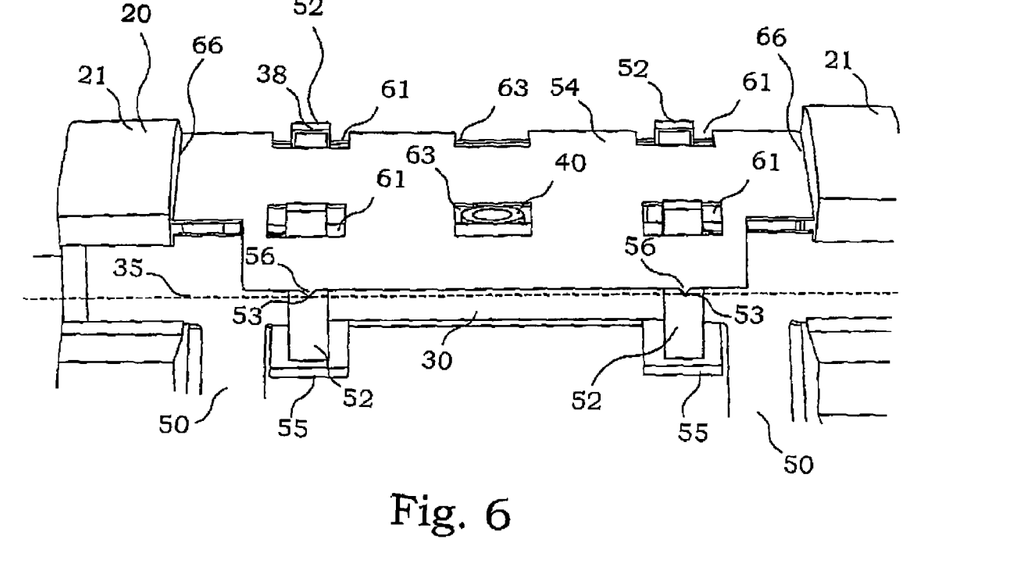
FIG. 6 is a perspective view of a part of an embodiment of an electromechanical motor according to the present invention having a mounted spring.

FIG. 6 illustrates an embodiment of an electromechanical motor 10 with a spring 54 mounted. The spring 54 is in this embodiment a folded metal plate, with suitable elastic properties for providing a normal force between the two electromechanical drive elements 30 and the body to be moved. The spring 54 is provided with four tips 56, which upon assembling are fitted into the back holes 53 of the pivot supports 52. These tips 56 then constitute the only force delivering contact to the electromechanical drive element assembly. By ensuring that the holes 53 are situated at the horizontal symmetry line 35 of the electromechanical drive element 30, also the normal forces delivered by the spring 54 are applied at this symmetry line 35. By doing this, the electromechanical drive elements 30 will be self-aligned to each other and to the body to be moved. One of the main issues is to get an even pressure along the contact area of the drive pad 40. The holes 53 and the spring tips 56 will also sure that the drive pads 40 will be symmetrically positioned on each side of the body 1 to be moved. A displacement of holes 53 relative the symmetry line 35 can also be advantageous when there is an additional torque from some other part of the stator 20, e.g. the flexible printed circuit board 50. A slight displacement of the holes 53 in a direction at right angle to the symmetry line will then give a more even pressure distribution on the drive pads 40. The tips 56 and holes 53 also prevent the spring 54 to accidentally falling off.

The spring 54 is in this embodiment provided with parallel edges 66 in the transversal direction. These edges 66 can in this embodiment be used for prohibiting any play parallel to the extension of the electromechanical drive element 30. Such an arrangement can thus be used as an alternative to the lugs on the flexible printed circuit board shown in FIG. 5a. If the spring 54 is used to support the longitudinal force it will in certain cases be advantageous to have the attachment points of the spring 54, i.e. the tips 56 along the symmetry line 35.

The spring 54 presents four openings 61, which are intended to fit over the extending tabs 55 of the flexible printed circuit board 50. This allows the spring 54 to be positioned very close to the electromechanical drive element 30, which gives a very slim overall design. When mounting the spring 54, the openings 61 and the tabs 55 will also serve as guiding tools to help the spring 54 finding its right position. Two additional holes 63 are provided in the spring 54 in this embodiment, intended for a mounting tool to grip.

Figure 7:
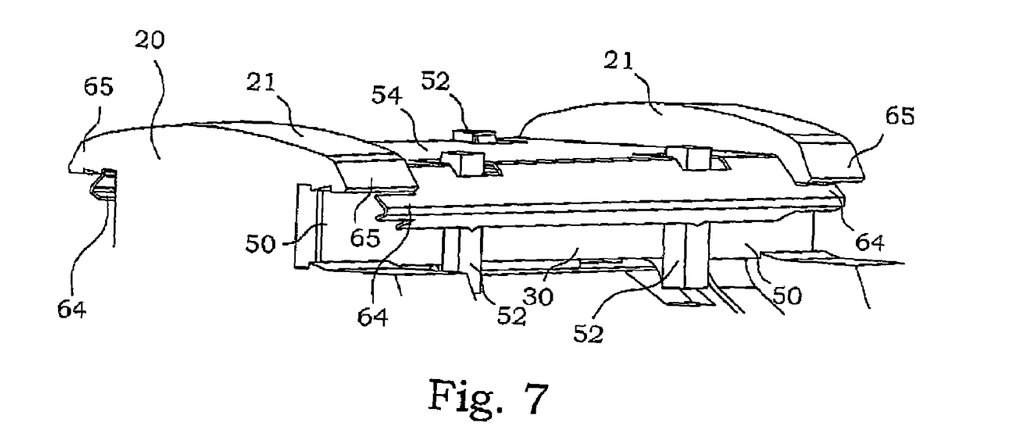
FIG. 7 is a perspective view of a part of another embodiment of an electromechanical motor according to the present invention having a mounted spring.

In FIG. 7, another embodiment of a spring 54 is illustrated. The stator backbone 21 is here provided with a protruding flange 65, and the spring is provided with a projection 64. Upon assembling, the spring is forced into place from above, whereby the projection 64 will be forced over the protruding flange 65. The interaction between the flange 65 and the projection 64 then prevents the spring 54 to fall off.

Above, different embodiments based on the same basic principle are presented. However, the protection scope should not be limited thereby, but should solely be defined by the appended claims. In particular, different details of the embodiments can be combined in any combination that is operational.

It is also understood by anyone skilled in the art, that the principles of the present invention can be applied to electromechanical motors of other basic designs than presented above. The embodiments of the detailed description should therefore only be considered as exemplifying embodiments enabling anyone skilled in the art to use the present invention.

A motor according to the present invention is designed for mass manufacturing. Therefore, there is a need for both a robust performance and a robust manufacturing process. If the tolerances during manufacturing are too narrow, there will be a reduction in yield and hence a higher cost. Too many processing steps will also increase the costs. The stator part in an embodiment of a motor according to the present invention is adapted for a manufacturing process using surface mounting, where electromechanical drive elements are placed on op of an electrical board. Typically, a solder is used to connect the elements to the board. An alternative technique is to use conducting adhesives.

The manufacturing process is greatly simplified since the electrical and mechanical connections are integrated. The mechanical and electrical connects should as described above be situated close to the nodal positions of a vibrating drive element. Since the electrical connect preferably also is used as the mechanical connect to the vibrating drive element, then there will be a pressure on these positions, which improves the robustness of these electrical supports. This is mainly due to the brittle nature of a solderable metallization on the ceramic drive element. Compressive stresses do normally not lead to failure while tensile stresses always have to be reduced far below the fracture limit. Without the pressure on the solder positions there will be a risk for tensile stresses when the stator is assembled or when the component is exposed to high acceleration, e.g. when a device is dropped in the floor.

The placement of the electrical connect at a position where the vibration amplitude is low, makes the electrical connects less sensitive to stresses due to vibration. Where the electrical connects are on the side faces of the drive element, the mechanical support will partly consist of the solder joint between the drive element and the board and partly of the mechanical contact between board and drive element. The mechanical support and in particular the pivot positions relative the drive element centre is important to get a robust performance of the motor. If the pivot point, i.e. the mechanical connect to the spring, is defined by the carrier and the soldering pad for electrical connections on the board and the drive element are used to get the proper placement, then both the performance and manufacturing robustness will be improved. The solder pads on the drive element and the board can be used to get a self-alignment due to the surface tension of the solder during the soldering process.

Figure 8:
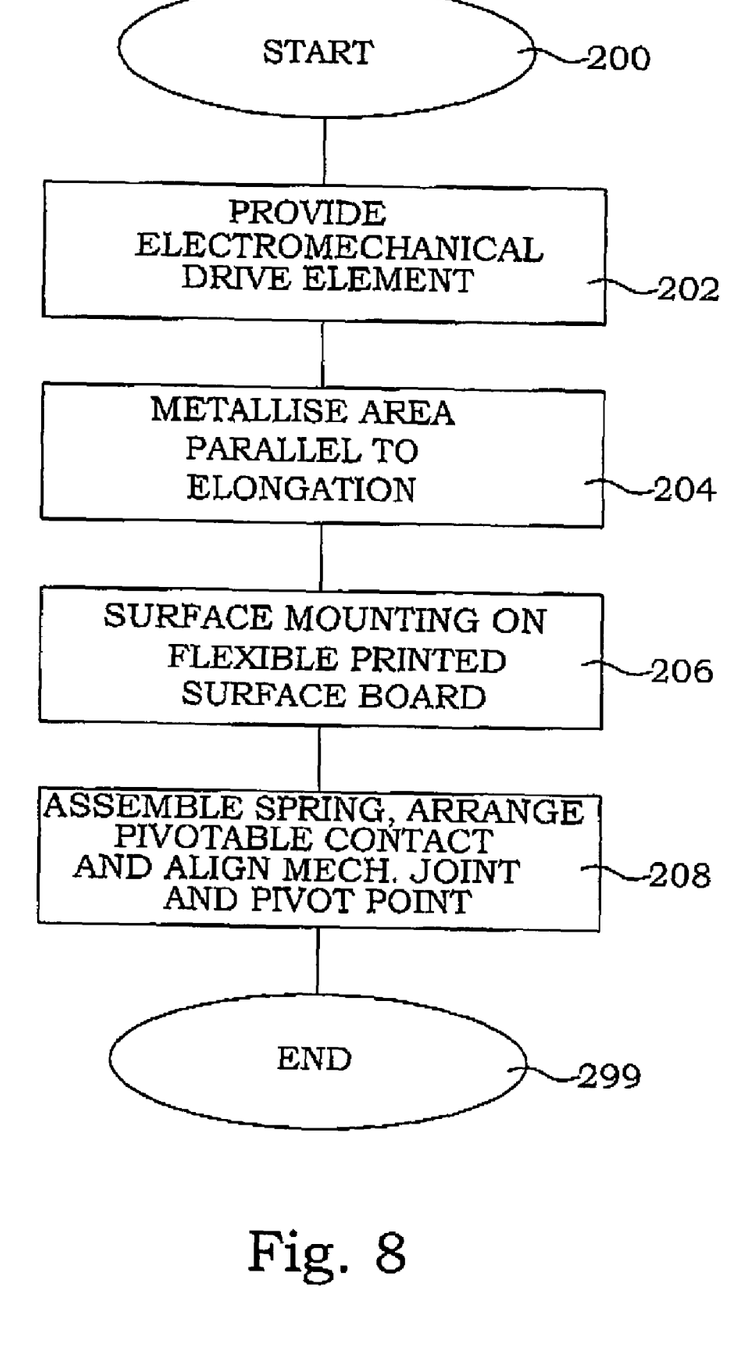
FIG. 8 is a flow diagram of the main steps of an embodiment of a method according to the present invention.

As described above, one of the objects of the present invention is to enable a precise and inexpensive assembling of electromechanical motors. FIG. 8 illustrates a flow diagram of the main steps of an embodiment of an assembling method according to the present invention. The procedure starts in step 200. In step 202, an electromechanical drive element is provided. The electromechanical drive element is generally elongated in a first direction, and is furthermore arranged for presenting a bending motion giving strokes in a second direction substantially perpendicular to the first direction when activated. Areas of the electromechanical drive element are metallized in step 204. The metallized areas are provided at surfaces that are substantially parallel to the first direction. In step 206, the electromechanical drive element is attached to a carrier. Preferably, this is performed by soldering the metallized portions of the electromechanical drive element to the carrier using surface mounting techniques. In step 208, a spring is mounted, exerting a force onto the carrier at a pivot point. The carrier is arranged pivotably at the pivot point for pivot motions around an axis directed substantially in the direction of the extension of the electromechanical drive element. The pivot point is positioned to be aligned with the mechanical joint and preferably also with the nodal point of the electromechanical drive element. The procedure ends in step 299.

REFERENCES

U.S. Pat. No. 6,437,485 B1
WO 00/44208

The invention claimed is:
1. Electromechanical actuator, comprising:
a carrier;
an electromechanical drive element, generally elongated in a first direction and mechanically attached by a joint to a first side of the carrier;
a spring arranged to apply a force at a pivot point on a second side of the carrier, opposite to the first side; and
control means for supply voltages creating a bending motion of the electromechanical drive element giving strokes in a second direction substantially perpendicular to the first direction;
the carrier being pivotable around an axis directed substantially in the first direction at the pivot point, relative to the spring;

the pivot point and the joint being situated in substantially the same plane perpendicular to the first direction.

2. Electromechanical actuator according to claim 1, wherein the pivot point and the joint being situated in substantially the same plane perpendicular to the first direction as a nodal point of the electromechanical drive element in the created bending motion the joint.

3. Electromechanical actuator according to claim 1, wherein the joint further constitutes an electric connection between the carrier and the electromechanical drive element.

4. Electromechanical actuator according to claim 1, wherein the plane is situated at a distance in the first direction from an end of the electromechanical drive element.

5. Electromechanical actuator according to claim 1, wherein the joint comprises a soldering.

6. Electromechanical actuator according to claim 5, wherein the electromechanical drive element has a metallized portion at a surface substantially parallel to the first direction, to which the soldering is attached.

7. Electromechanical actuator according to claim 6, wherein the surface is parallel also to the second direction.

8. Electromechanical actuator according to claim 7, wherein the metallized portion provides, electrical connection to electrodes in the electromechanical drive element.

9. Electromechanical actuator according to claim 6, wherein the surface is perpendicular to the second direction.

10. Electromechanical actuator according to claim 5, wherein the electromechanical drive element is centered to the carrier by the metallized portion.

11. Electromechanical actuator according to claim 1, wherein the joint comprises a glue.

12. Electromechanical actuator according to claim 1, wherein the carrier at least comprises a flexible printed circuit board.

13. Electromechanical actuator according to claim 12, wherein the carrier further comprises a pivot support, at which the pivot point is situated.

14. Electromechanical actuator according to claim 1, wherein the electromechanical drive element comprises two interconnected active sections and a drive pad attached substantially at the interconnection between the active sections, whereby each active section being attached to the carrier by two joints.

15. Electromechanical actuator according to claim 14, wherein the two joints at each active section are provided on opposite sides of the electromechanical drive element.

16. Electromechanical actuator according to claim 14, wherein the two joints at each active section are provided on the same side of the electromechanical drive element.

17. Electromechanical actuator according to claim 1, wherein the carrier comprises end stops supporting forces in a main motion direction.

18. Electromechanical actuator according to claim 1, wherein the spring supports against a stator backbone for supporting forces in a main motion direction.

19. Electromechanical actuator according to claim 1, comprising two electromechanical drive elements arranged at opposite sides of a body to be moved, whereby each of the electromechanical drive elements comprises two interconnected active sections and a drive pad attached substantially at the interconnection between the active sections, the body to be moved being positioned between the two drive pads, whereby the spring presses the electromechanical drive elements together against the body to be moved.

20. Electromechanical actuator according to claim 19, wherein the spring presses each electromechanical drive element via the carrier at two pivot points, in the vicinity of a respective nodal point.

21. Electromechanical actuator according to claim 20, wherein the pivot points being situated at a symmetry surface of the electromechanical drive elements.

22. Electromechanical actuator according to claim 14, wherein the drive pad comprises a cylinder, which is attached in a recess formed in the electromechanical drive element.

23. Electromechanical actuator according to claim 1, wherein the carrier protrudes to the sides outside the electromechanical drive element, at least in the vicinity of the joint.

* * * * *